(12) United States Patent
McCarthy et al.

(10) Patent No.: US 8,694,702 B2
(45) Date of Patent: Apr. 8, 2014

(54) INPUT COMMAND

(75) Inventors: John McCarthy, Pleasanton, CA (US); John Briden, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 136 days.

(21) Appl. No.: 13/387,330

(22) PCT Filed: Feb. 11, 2010

(86) PCT No.: PCT/US2010/023821
§ 371 (c)(1),
(2), (4) Date: Jan. 26, 2012

(87) PCT Pub. No.: WO2011/099969
PCT Pub. Date: Aug. 18, 2011

(65) Prior Publication Data
US 2012/0131229 A1 May 24, 2012

(51) Int. Cl.
*G06F 13/12* (2006.01)
*G06F 3/00* (2006.01)

(52) U.S. Cl.
USPC ............. 710/64; 710/2; 710/5; 710/8; 710/15

(58) Field of Classification Search
None
See application file for complete search history.

(56) References Cited

U.S. PATENT DOCUMENTS

| | | | |
|---|---|---|---|
| 7,152,172 B2 | 12/2006 | Tsirkel et al. | |
| 2007/0152976 A1 | 7/2007 | Townsend et al. | |
| 2008/0134102 A1 | 6/2008 | Movold et al. | |
| 2008/0170042 A1 | 7/2008 | Yoon et al. | |
| 2008/0196945 A1 | 8/2008 | Konstas | |
| 2009/0040193 A1* | 2/2009 | Geaghan | 345/174 |
| 2009/0085873 A1 | 4/2009 | Betts et al. | |
| 2009/0296997 A1* | 12/2009 | Rocheford | 382/124 |

FOREIGN PATENT DOCUMENTS

| | | |
|---|---|---|
| GB | 2460580 | 12/2009 |
| JP | 11242733 | 2/1998 |

OTHER PUBLICATIONS

Bogdan Raducanu et al, Human Presence Detection by Smart Devices, http://www.cvc.uab.es/~bogdan/Publications/raducanu_eis2004.pdf, UCE Group-Technical University of Eindhoven, 2004.
G Vasily, et al, A Hardware Design for Camera-Based Power Management of Computer Monitor, http://ieeexplore.ieee.org/xpl/freeabs_all.jsp?arnumber=4669238, pp. 203-209; Sep. 3-5, 2008. Dept of Electronics Engineering; Computer Science, Fukuoka University.
ISA/KR, International Search Report dated Oct. 20, 2010, PCT/US2010/023821 filed Feb. 11, 2010.
Method for Laptop Mouse Pad User-Presence Detection, http://priorartdatabase.com/IPCOM/000009803/IP.com Prior Art Database Disclosure dated Sep. 19, 2002.

\* cited by examiner

*Primary Examiner* — Scott Sun
(74) *Attorney, Agent, or Firm* — Chun-Liang Kuo

(57) ABSTRACT

A method for detecting an input command including configuring a sensor to determine whether a user is within a proximity of a computing machine, configuring an input device to detect an input command entered by the user when the user is within the proximity of the computing machine, and transmitting the input command for the computing machine to process.

14 Claims, 7 Drawing Sheets

INPUT COMMAND

CROSS-REFERENCE TO RELATED APPLICATION

This application is a national stage application under 35 U.S.C. §371 of PCT/US2010/023821 filed Feb. 11, 2010.

BACKGROUND

When a computing machine processes an input command, a user can access an input device of the computing machine and the input device can be configured to detect an input. The user can operate the input device to enter one or more inputs for the input device. In response to one or more inputs, the input device can transmit the input for the computing machine to process as an input command.

BRIEF DESCRIPTION OF THE DRAWINGS

Various features and advantages of the disclosed embodiments will be apparent from the detailed description which follows, taken in conjunction with the accompanying drawings, which together illustrate, by way of example, features of the embodiments.

DETAILED DESCRIPTION

Figure 1:
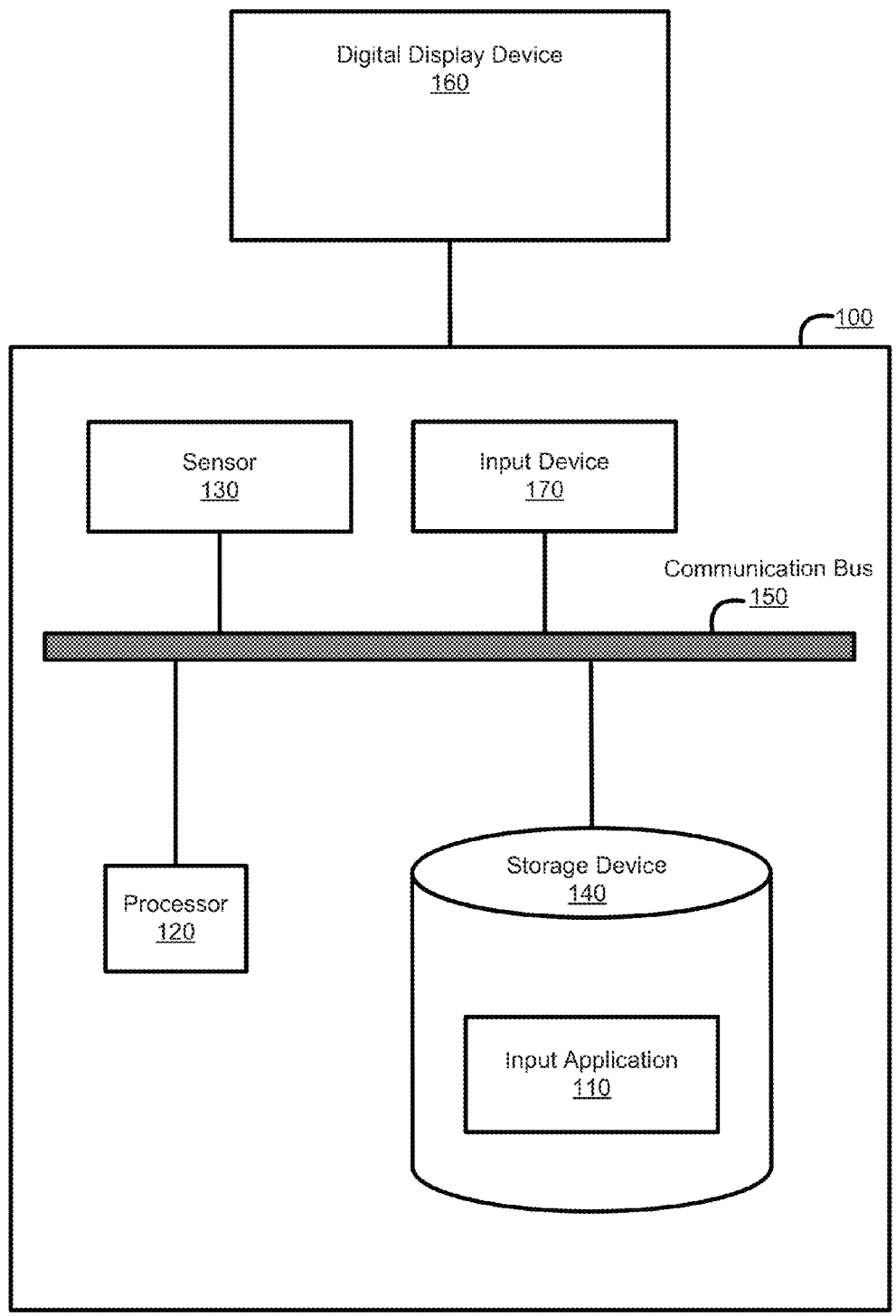
FIG. 1 illustrates a computing machine coupled to a sensor and an input device according to an embodiment of the invention.

FIG. 1 illustrates a computing machine 100 coupled to a sensor 130 and an input device 170 according to an embodiment of the invention. In one embodiment, the computing machine 100 is a desktop, laptop/notebook, netbook, and/or any other computing device the sensor 130 and/or the input device 170 can be coupled to.

As illustrated in FIG. 1, the computing machine 100 is coupled to a processor 120, a sensor 130, an input device 170, a digital display device 160, a storage device 140, and a communication bus 150 for the computing machine 100 and/or one or more components of the computing machine 100 to communicate with one another.

Further, as shown in FIG. 1, the storage device 140 can store an input application 110. In other embodiments, the machine 100 includes additional components and/or is coupled to additional components in addition to and/or in lieu of those noted above and as illustrated in FIG. 1.

As noted above, the machine 100 includes a processor 120. The processor 120 sends data and/or instructions to one or more components of the computing machine 100, such as the sensor 130, the input device 170, the digital display device 160, and/or the input application 110. Additionally, the processor 120 receives data and/or instruction from one or more components of the computing machine 100, such as the sensor 130, the input device 170, and/or the input application 110.

The input application 110 is an application which can be utilized in conjunction with the processor 120 and at least one sensor 130 to determine whether a user is within a proximity of the computing machine 100. For the purposes of this application, a user is determined to be within a proximity of the computing machine when the sensor 130 determines that the user is within a predefined distance or radius of the computing machine 100 and/or the sensor 130.

Additionally, the input application 110 can configure the input device 170 to detect or reject an input command entered by the user in response to whether the user is determined to be within the proximity of the computing machine 100. Further, the input application 110 can transmit and/or process input commands received by the input device 170.

The input application 110 can be firmware which is embedded onto the computing machine 100. In other embodiments, the input application 110 is a software application stored on the computing machine 100 within ROM or on the storage device 140 accessible by the computing machine 100 or the input application 110 is stored on a computer readable medium readable and accessible by the computing machine 100 from a different location.

Additionally, in one embodiment, the storage device 140 is included in the computing machine 100. In other embodiments, the storage device 140 is not included in the computing machine 100, but is accessible to the computing machine 100 utilizing a network interface of the computing machine 100. The network interface can be a wired or wireless network interface card.

In a further embodiment, the input application 110 is stored and/or accessed through a server coupled through a local area network or a wide area network. The input application 110 communicates with devices and/or components coupled to the computing machine 100 physically or wirelessly through a communication bus 150 included in or attached to the computing machine 100. In one embodiment the communication bus 150 is a memory bus. In other embodiments, the communication bus 150 is a data bus.

As noted above, the input application 110 can be utilized in conjunction with the processor 120 and at least one sensor 130 to determine whether a user is within a proximity of the computing machine 100 and/or at least one sensor 130. When determining whether a user is within a proximity of the computing machine 100, the input application 110 and/or the processor 120 can configure the sensor 130 to scan an environment around the computing machine 100 for a user. The environment includes a space around the computing machine 100 and the objects within the space.

A sensor 130 is a detection device configured to scan for or receive information from the environment around the sensor 130 or the computing machine 100. In one embodiment, a sensor 130 can include at least one from the group consisting of a motion sensor, a proximity sensor, and infrared sensor, and/or an image capturing device. In other embodiments, a sensor 130 can include additional devices and/or components configured to receive and/or scan for information from an environment around the sensor 130 or the computing machine 100.

At least one sensor 130 can be coupled to one or more locations on or around the computing machine 100. In another embodiment, at least one sensor 130 can be integrated as part of the computing machine 100. In other embodiments, at least one of the sensors 130 can be coupled to or integrated as part of one or more components of the computing machine 100, such as a digital display device 160.

Additionally, at least one sensor 130 can be configured to face towards one or more directions around the computing machine 100. In one embodiment, at least one of the sensors 130 is a front facing sensor. Further, at least one sensor 130 can be configured to rotate around and/or reposition along one or more axis.

A digital display device 160 is a display device that can create and/or project one or more images and/or videos for display. In one embodiment, the digital display device 160 can be a monitor and/or a television. In another embodiment, the digital display device 160 is a projector that can project one or more images and/or videos. Additionally, the digital display device 160 can be coupled to the computing machine 100 or the digital display device can be integrated as part of the computing machine 100.

A sensor 130 can be configured by the processor 120 and/or the input application 110 to actively scan for the information from the environment. When configuring the sensor 130, the processor 120 and/or the input application 110 can send one or more instructions for the sensor 130 to scan the environment for the information. In another embodiment, the sensor 130 can be configured to periodically and/or upon request scan for the information from the environment.

For the purposes of this application, the information can specify whether an object is present in the environment, a size of the object, a shape of the object, a distance of the object, and/or whether the object is moving or stationary. In other embodiments, the information can specify additional details of the object or the environment in addition to and/or in lieu of those noted above.

Additionally, the sensor 130 can be configured by the input application 110 and/or the processor 120 to interpret or process the information. In other embodiments, the sensor 130 can receive the information and transmit the information for the input application 110 and/or the processor 120 to interpret or process.

When scanning for or receiving information from the environment, the sensor 130 can be configured to scan a viewing area of the sensor 130 for objects within the environment. If an object is found in the viewing area, the sensor 130 can proceed to identify a size and/or a shape of the object. Further, the sensor 130 can determine a distance of the object or user from the sensor 130 or computing machine 100. The sensor 130 can additionally scan for movement of the object to determine whether the object is active or stationary within the environment.

In another other embodiment, the sensor 130 can emit one or more signals and scan for feedback from the signals. The signals can reflect off of an object within the environment. The sensor 130 can then proceed to detect an amount of signals reflected and/or a direction of the reflected signals to identify a size and/or shape of the object within the environment.

The sensor 130 can also detect a series of signals and compare the series of signals to determine whether the object is stationary or active. Further, the sensor 130 and/or the input application 110 can measure an amount of time taken for the signals to return to the sensor 130 to identify a distance of the object from the sensor.

Utilizing the information received from the sensor 130, the input application 110 can determine whether an object in the environment is a user. In one embodiment, the input application 110 compares an identified shape and size of the object to a predefined size and/or shape of a user. The predefined size and/or shape of the user can be defined by a user or the computing machine 100. Additionally, the predefined size and/or shape can be stored on the computing machine 100 or the sensor 130.

In another embodiment, the input application 110 additionally considers whether the object is active or stationary when determining whether the object is a user. Further, the sensor 130 and/or the input application 110 can additionally utilize facial detection technology when determining whether the object in the environment is a user. The facial detection technology can be hardware and/or software based. In other embodiments, the sensor 130 can scan for and/or identify users utilizing additional methods in addition to and/or in lieu of those noted above.

Once the input application 110 has determined that the object is a user, the input application 110 can proceed to determine whether the user is within a proximity of the computing machine 100. When determining whether the user is within a proximity of the computing machine 100, the input application 110 can compare an identified distance of the user and compare it to a predefined distance. If the user is identified by the input application 110 and/or the sensor 130 to be within the predefining distance, the input application 110 will determine that the user is within a proximity of the computing machine 100.

If the user is determined to be within the proximity of the computing machine 100, the input application 110 proceeds to configure at least one input device 170 to detect an input command entered by the user. An input device 170 is a device which a user can access and/or utilize when entering one or more input commands for the computing machine 100.

At least one input device 170 can include a touch display device, a keyboard, a mouse, a microphone, and/or an image capturing device. The touch display device can be included and/or be part of the digital display device 160. In another embodiment, the sensor 130 of the computing machine 100 can additionally be utilized as an input device 170. In other embodiments, the input device 170 can be or include additional devices configured to detect one or more inputs entered by a user.

When configuring the input device 170, the input application 110 and/or the processor 120 send one or more instructions for the input device 170 to scan for the user accessing the input device and to detect one or more inputs entered by the user. If the input device 170 detects any inputs entered by the user, the input device 170 can communicate and/or transmit the input to the input application 110. The input application 110 can then interpret an input command from the input entered by the user for the computing machine 100 to process.

In another embodiment, if the input application 110 has determined that a user is not within a proximity of the computing machine 100, the input application 110 can reject an input command detected. When rejecting a detected input command, the input application 110 can ignore and/or not process any inputs received by the input device 170. The input application 110 can continue to ignore and/or not process any inputs received by the input device 170 until a user is determined to be within a proximity of the computing machine 100.

In another embodiment, the input application 110 can additionally configure the computing machine 100 to enter and/or transition into a low power state when the sensor 130 does not detect the user within a proximity of the computing machine 100 after a predefined period of time. The predefined period of time can be defined by a user and/or by the computing machine 100.

The computing machine 100 can include one or more power states. In one embodiment, the computing machine 100 includes a low power state and a high power state. When in the low power state, the computing machine 100 can reduce the amount of power supplied to one or more components of the computing machine 100. Additionally, when in the low power state, the input application 110 and/or the processor 120 can configure one or more components of the computing machine to enter a low power mode or sleep state.

The computing machine 100 can be configured by the process 120 and/or the input application 100 to transition to and/or from one or more of the power states in response to whether a user is determined by the sensor 130 to be within a proximity of the computing machine 100.

Figure 2:
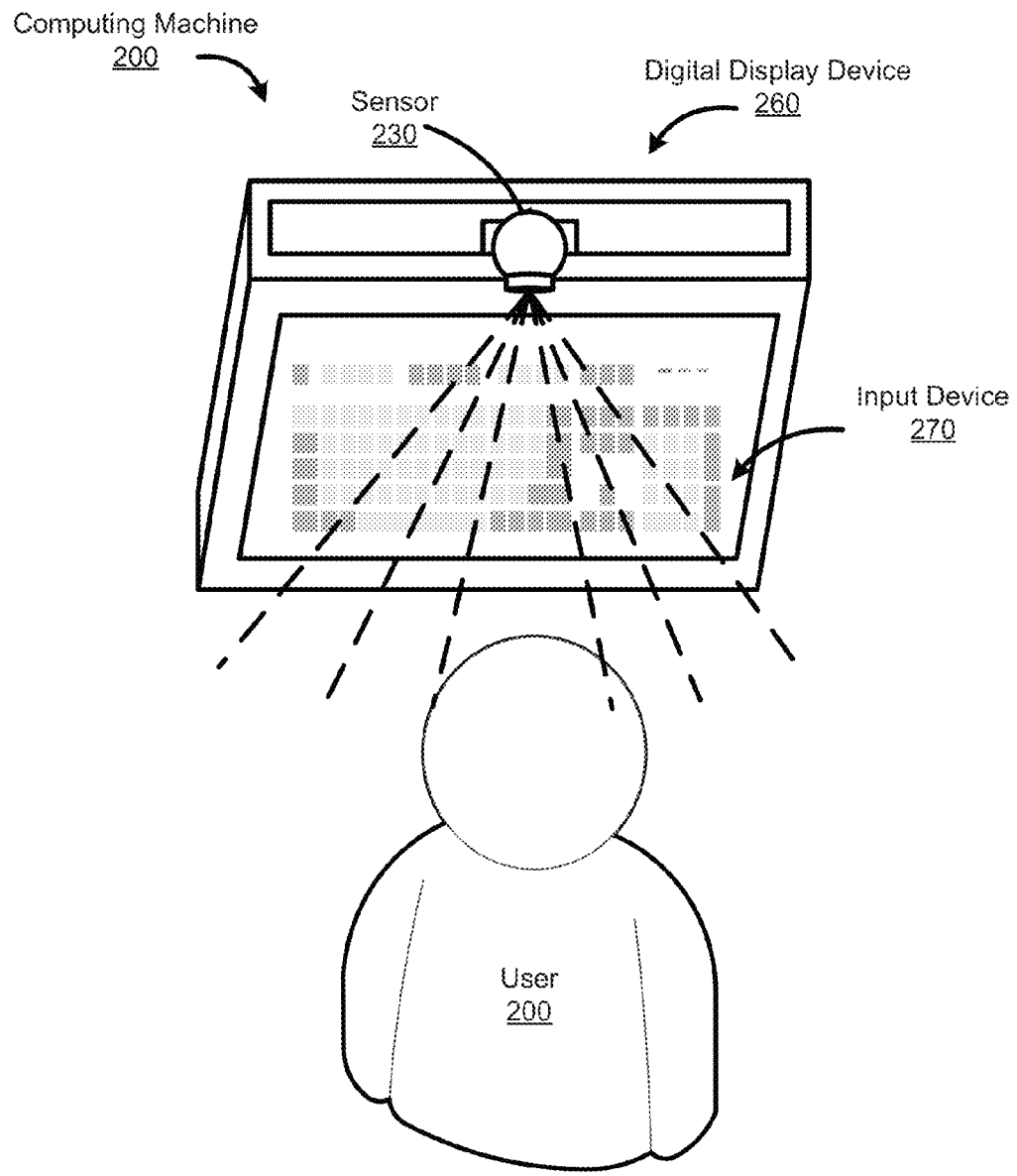
FIG. 2 illustrates a sensor configured to determine whether a user is within a proximity of a computing machine according to an embodiment of the invention.

FIG. 2 illustrates a sensor 230 configured to determine whether a user 200 is within a proximity of a computing machine 200 according to an embodiment of the invention. As illustrated in FIG. 2, in one embodiment, the sensor 230 can be an image and/or video capturing device and the sensor 230 can be coupled to a digital display device 260 of the computing machine 200. In other embodiments, the sensor 230 can be additional detection devices and the sensor 230 can be coupled to additional locations or positions around the computing machine 200.

As shown in the present embodiment, the sensor 230 can capture a view of an environment around the computing machine 200 by scanning and/or detecting information around the computing machine 200. The sensor 230 captures a view of any objects within the environment of the computing machine 200. As noted above, the sensor 230 can actively scan the environment for an object or the sensor 230 can periodically or upon request scan the environment for an object.

As illustrated in FIG. 2, the sensor 230 has detected object 200 within the environment. Once an object 200 has been found within a view of the sensor 230, the sensor 230 can continue to capture additional information of the object 200. In one embodiment, the sensor 230 captures and identifies a size and a shape of the object 200. In another embodiment, the sensor 230 additionally identifies a distance of the object 200 and determines whether the object 200 is stationary or moving.

The sensor 230 passes information of the object 200 to an input application of the computing machine 200. The input application can then determine whether the object 200 is a user and whether the user is within a proximity of the computing machine 200. In other embodiments, the sensor 230 can analyze the information captured and determined whether the object 200 is a user.

As noted above, the input application can compare the identified shape and size of the object 200 to a predefined size and/or shape of a user. The predefined size and/or shape of the user can be defined by a user or the computing machine. In one embodiment, the predefined size and/or shape of the user can be adjusted by the input application in response to an identified distance of the object 200.

In another embodiment, the input application and/or the sensor 230 additionally utilize facial detection technology when determining whether the object is a user 200. If a face is detected, the input application will determine that the object 200 is a user 200. In another embodiment, the input application further considers whether the object is active or stationary when determining whether the object 200 is a user 200.

Once a user 200 has been identified within the environment around the computing machine 200, the input application can proceed to determine whether the user 200 is within a proximity of the computing machine 200. As noted above, the input application can compare the identified distance of the user 200 and compare it to a predefined distance. If the user is identified to be of a distance less than or equal to the predefined distance, then the input application will determine that the user 200 is within a proximity of the computing machine 200.

As illustrated in FIG. 2, in response to the user 200 being determined to be within a proximity of the computing machine 200, the input application configures at least one input device 270 to detect an input command entered by the user. As shown in the present embodiment, the input device 270 can be coupled to and/or integrated as part of the computing machine 200 and/or the digital display device 260. Additionally, as illustrated in FIG. 2, the digital display device 260 can be configured to render an interface for the user 200 to interact with when entering inputs.

Figure 3:
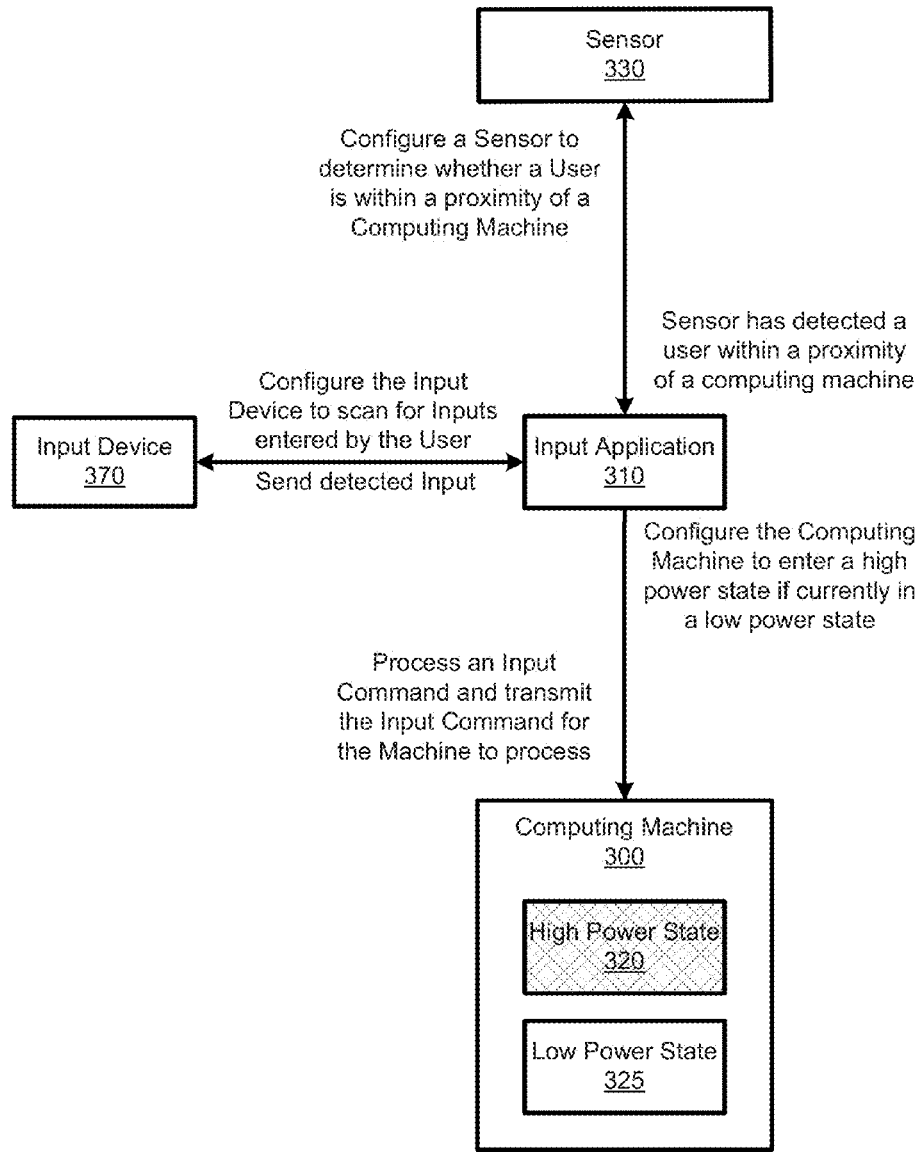
FIG. 3 illustrates a block diagram of an input application processing an input command and configuring a computing machine according to an embodiment of the invention.

FIG. 3 illustrates a block diagram of an input application 310 processing an input command and configuring a computing machine 300 according to an embodiment of the invention. As illustrated in FIG. 3, the input application 310 and/or a processor of the computing machine 300 configure a sensor 330 to determine whether a user is within a proximity of the computing machine.

One or more instructions are sent to the sensor 330 by the input application 310 or the processor for the sensor 330 to scan an environment around the computing machine 300 for any objects. As illustrated in the present embodiment, the sensor 330 has detected an object within the environment and the sensor 330 has determined that the object is a user within a proximity of the computing machine 300.

In another embodiment, when the sensor 330 detects an object within the environment, the sensor 330 identifies additional information of the object and sends the information to the input application 310. The input application 310 then analyzes the information to determine whether the object is a user and whether the user is within a proximity of the computing machine 300.

In one embodiment, if the user is determined to be within a proximity of the computing machine 300, the input application proceeds to determine whether the computing machine 300 is in a high power state 320 or a low power state 325. As noted above, the computing machine 300 can enter and/or transition into one or more power states.

If the input application 310 determines that the computing machine 300 is currently in a low power state 325, the input application 310 instructs the process and/or the computing machine 300 to transition into a high power state. If the computing machine 300 is already in a high power state 320, the input application 310 instructs the processor and/or the computing machine 300 to remain in the high power state 320.

When in a high power state 320, the computing machine 300 continues to supplies power to the sensor 330 and the input device 370. The sensor 330 continues to receive power from the computing machine 300 so that the input application 310 and/or the sensor 330 can continue to determine whether a user is within a proximity of the computing machine.

Additionally, when in the high power state 320, an input device 370 is configured to detect and scan for any inputs entered by the user. The input application 310 can send one or more instructions for the input device 370 to detect and/or scan for any input or input commands entered by the user.

The input device 370 can send any detected inputs to the input application 310 for the input application 310 to process. When processing an input entered by a user, the input application 310 identifies an associated input command corresponding to the input and proceeds to process the input command. In another embodiment, the input application transmits the input command for the processor and/or one or more additional components of the computing machine 300 to process. In other embodiments, the input device 370 interprets an input entered by the user and identifies an associated input command. The input device 370 then transmits the input command for the input application 310 and/or the computing machine 300 to process.

Figure 4:
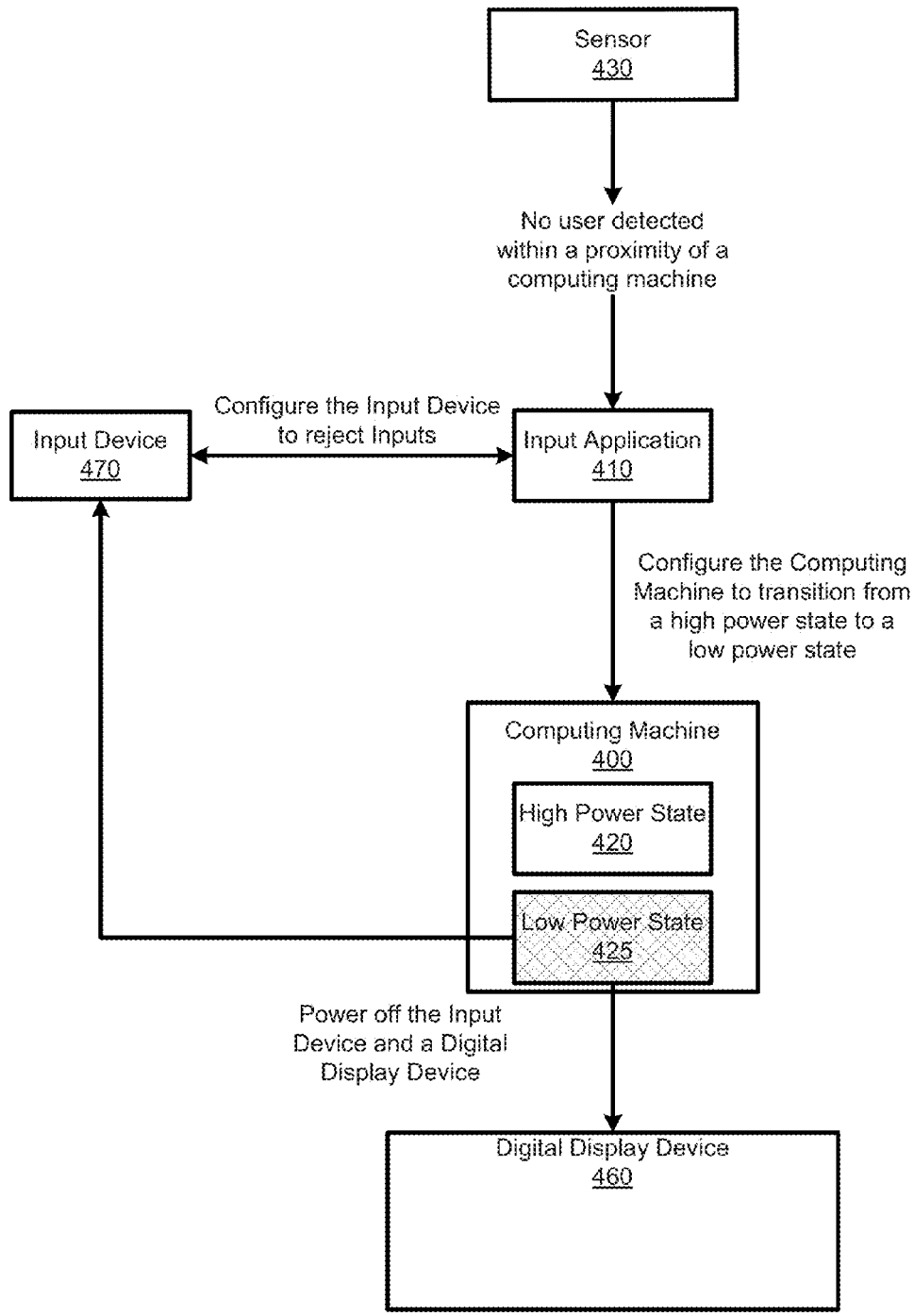
FIG. 4 illustrates a block diagram of an input application rejecting an input command and configuring a computing machine according to an embodiment of the invention.

FIG. 4 illustrates a block diagram of an input application 410 rejecting an input command and configuring a computing machine 400 according to an embodiment of the invention. As illustrated in FIG. 4, a sensor 430 coupled to the computing 400 has determined that a user is not detected within a proximity of the computing machine 400. In one embodiment, a user is determined to not be within a proximity of the computing machine 400 when the user is not present in an environment around the computing machine 400 or the user is not within a predefined distance of the computing machine 400.

When determining whether the user is within a proximity of the computing machine 400, an input application 410 of the computing machine 400 polls the sensor 430 for this information. In other embodiments, the sensor 430 periodically sends the information or updates to the input application 410.

As noted above, in response to the user not being within a proximity of the computing machine 400, the input application 410 rejects any inputs received from an input device 470 of the computing machine 400. In one embodiment, when rejecting the inputs, the input device 470 remains powered on and continues to detect and sends inputs to the input application 410. The input application 410 can then reject any of the inputs received while a user is not within a proximity of the computing machine 400.

In another embodiment, when rejecting inputs, the input application 410 can configure the input device 470 to reject any detected inputs. In other embodiments, the input application 410 can and/or the processor can configure the computing machine 400 to enter into a low power state 425. The input application 410 and/or the processor can configure the computing machine 400 to enter and/or transition into the low power state 425 after a period of time of not detecting a user within a proximity of the computing machine 400. The period of time can be predefined by a user or the computing machine 400.

As noted above, when in a low power state 425, one or more components of the computing machine 400 can be powered off and/or configured to enter into a sleep state or low power state. As illustrated in FIG. 4, in one embodiment, when entering and/or transitioning into the computing machine 400, the input device 470 and/or a digital display device 460 coupled to the computing machine 400 are configured to power off. As a result, the input device 470 will not detect any inputs.

Additionally, while the computing machine 400 is in a low power state, the sensor 430 continues to receive power from the computing machine 400 and continues to scan for a user within a proximity of the computing machine 400. While the computing machine 400 is in a low power state, if a user is determined by the sensor 430 and/or the input application 410 to come within a proximity of the computing machine 400, the input application 410 and/or the processor can configure the computing machine 400 to transition from the low power state 425 to the high power state 420.

As a result, the input device 470 can proceed to detect inputs entered by the user and the inputs can be processed as input commands by the input application 410 or the computing machine 400.

Figure 5:
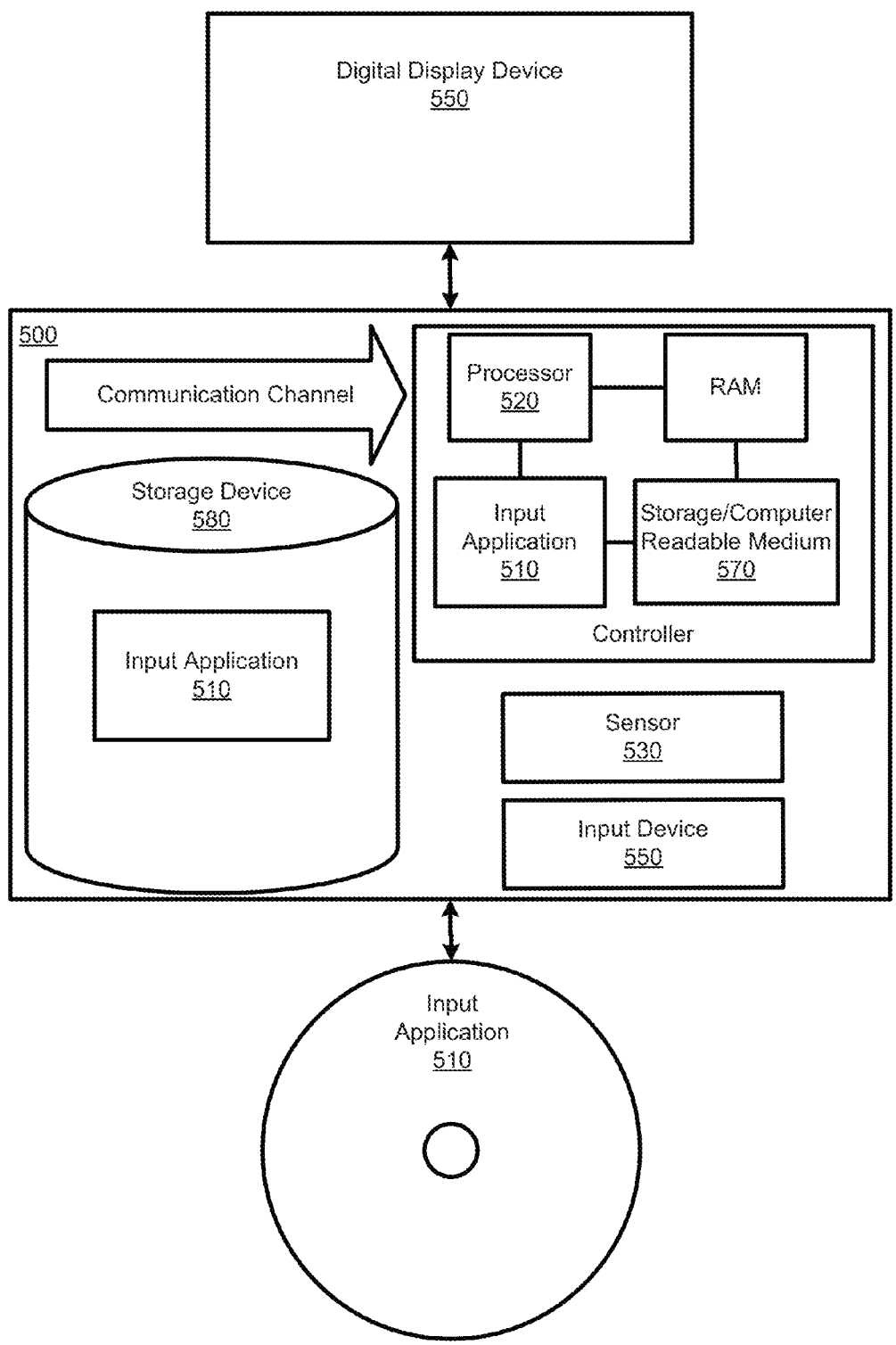
FIG. 5 illustrates a computing machine with an embedded input application and an input application stored on a removable medium being accessed by the computing machine according to an embodiment of the invention.

FIG. 5 illustrates a computing machine 500 with an embedded input application 510 and an input application 510 stored on a removable medium being accessed by the computing machine 500 according to an embodiment of the invention. For the purposes of this description, a removable medium is any tangible apparatus that contains, stores, communicates, or transports the application for use by or in connection with the computing machine 500. As noted above, in one embodiment, the input application 510 is firmware that is embedded into one or more components of the computing machine 500 as ROM. In other embodiments, the input application 510 is a software application which is stored and accessed from a hard drive, a compact disc, a flash disk, a network drive or any other form of computer readable medium that is coupled to the computing machine 500.

Figure 6:
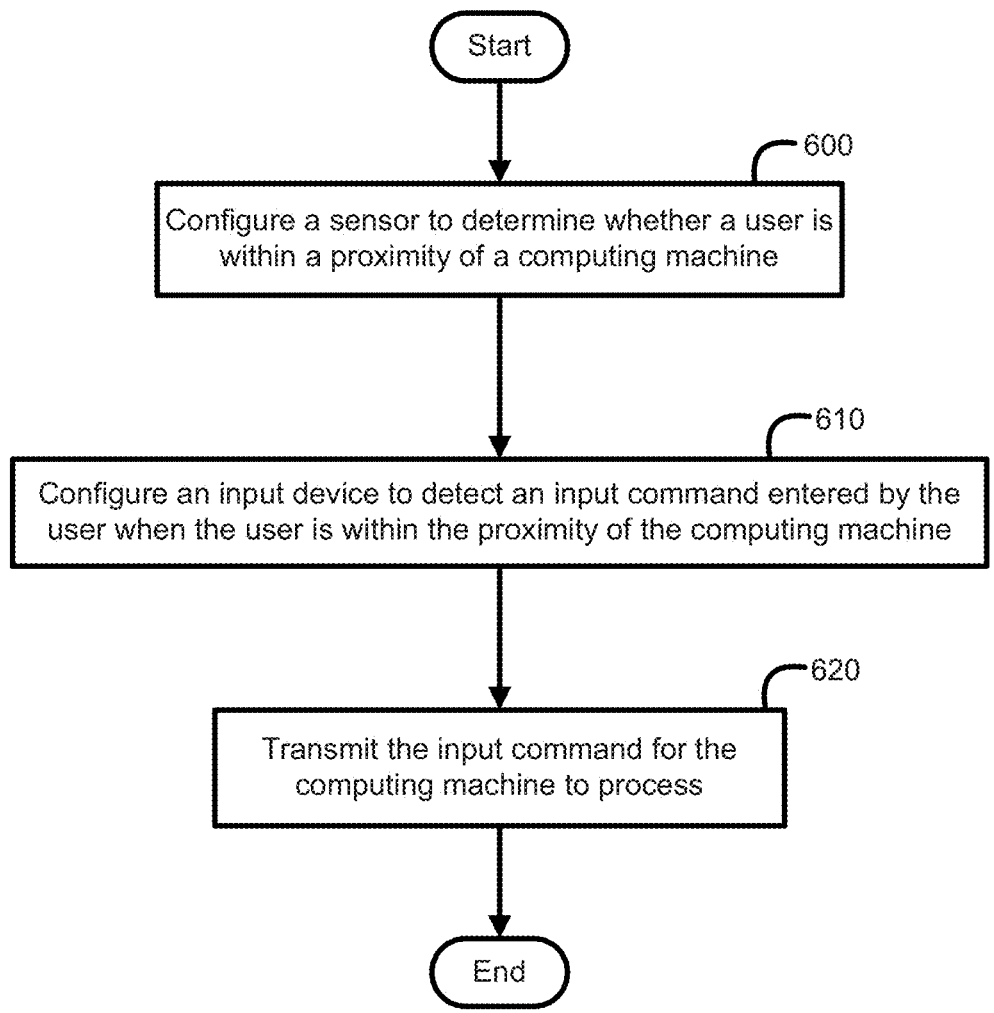
FIG. 6 is a flow chart illustrating a method for detecting an input command according to an embodiment of the invention.

FIG. 6 is a flow chart illustrating a method for detecting an input command according to an embodiment of the invention. The method of FIG. 6 uses a computing machine coupled to a processor, a sensor, an input device, a digital display device, and an input application. In other embodiments, the method of FIG. 6 uses additional components and/or devices in addition to and/or in lieu of those noted above and illustrated in FIGS. 1, 2, 3, 4, and 5.

As noted above, the input application is initially configured by the processor to access at least one sensor and to configure a sensor to determine whether a user is within a proximity of the computing machine 600. The input application and/or the processor send one or more instructions for the sensor to continuously, periodically, and/or upon request scan for the user.

As noted above, when scanning for a user, the sensor and/or the input application analyze information of an object captured by the sensor. A sensor is a detection device configured to scan and/or receive information from an environment around the computing machine. A sensor can be positioned at one or more positions around the environment. Additionally, the sensor can be coupled to and/or integrated to the computing machine or one or more components of the computing machine.

A sensor can be a motion sensor, a proximity sensor, an infrared sensor, and/or an image capturing device. In other embodiments, a sensor can be other detection devices configured to scan an environment around the computing machine.

As noted above, if the sensor detects an object within the environment, the sensor can continue to identify and capture additional information of the object. The information can specify a size and/or shape of the object. Additionally, the information can identify a distance of the object and/or determine whether the object is stationary or moving.

Utilizing the information of the object, the sensor and/or the input application can determine whether the object is a user. If the object has a shape and a size that match a predefined shape and size of a user, then the object will be identified by the sensor and/or the input application as a user. In one embodiment, the sensor and/or the input application additionally utilize facial detection technology when determining whether the object is a user.

If the object is determined to be a user, the sensor and/or the input application proceed to determine whether the user is within a proximity of the computing machine. The sensor and/or the input application can compare an identified distance of the user to a predefined distance. If the identified distance of the user is less than or equal to the predefined distance, then the user will be determined to be within a proximity of the computing machine.

Once a user is determined to be within a proximity of the computing machine, the input device can be configured by the processor and/or the input application to detect any inputs entered by the user 610. In one embodiment, once the user is determined to be within the proximity of the computing machine, the input application will continue to determine whether the computing machine is in a high power state or a low power state.

As noted above, the computing machine can include at least two power states and the computing machine can enter and/or transition into one or more of the power states in response to whether the user is within a proximity of the computing machine.

If the computing machine is already in a high power state, the input application can configure the computing machine to remain in the high power state. In another embodiment, if the computing machine is currently in a low power state, the computing machine can be configured to transition into the high power state.

When in the high power state, an input device can be configured to detect inputs enters by the user. The input device can be any device which a user can interact with to enter one or more inputs as commands. In one embodiment, the input device is a touch display and is integrated with a digital display device of the computing machine. In another embodiment, the sensor can additionally operate as an input device.

If the input device detects any inputs from the user, the input device can transmit the input for the input application and/or the computing machine to indentify a corresponding input command and to process the input command 620. In other embodiments, the input device can identify a corresponding input command proceed to transmit the input command for the input application or the computing machine to process.

In other embodiments, if a user is not determined to be within a proximity of the computing machine, the computing machine can enter a low power state. Additionally, any inputs from the input device can be rejected by the input application and/or by the input device. In one embodiment, the input device can additionally be configured to power off or enter a sleep state while in the low power state.

The method is then complete or the input application can continue to determine whether a user comes within a proximity of the computing machine repeating the method disclosed above. In other embodiments, the method of FIG. 6 includes additional steps in addition to and/or in lieu of those depicted in FIG. 6.

Figure 7:
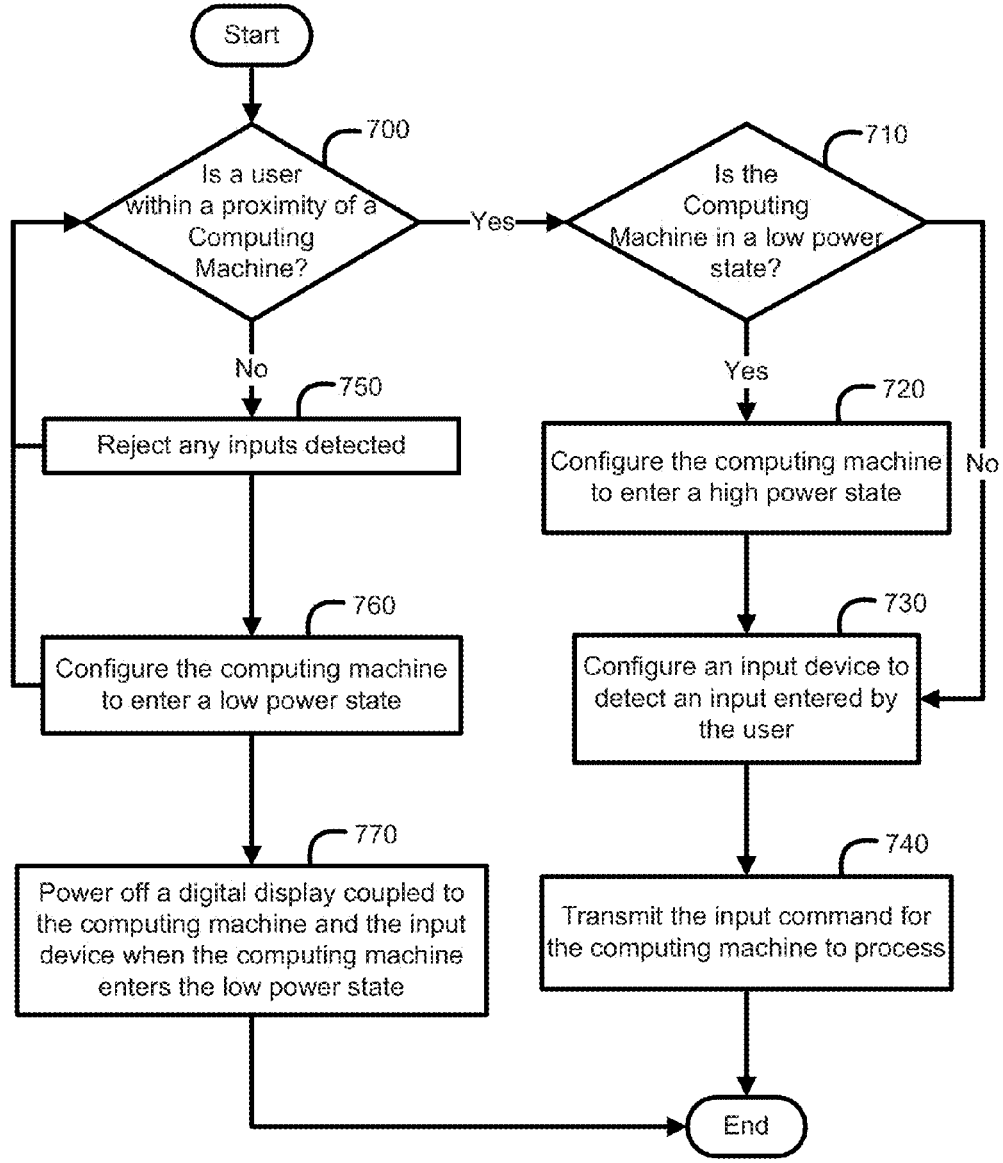
FIG. 7 is a flow chart illustrating a method for detecting an input command according to another embodiment of the invention.

FIG. 7 is a flow chart illustrating a method for detecting an input command according to another embodiment of the invention. Similar to the method of FIG. 6, the method of FIG. 7 uses a computing machine coupled to a processor, a sensor, an input device, a digital display device, and an input application. In other embodiments, the method of FIG. 7 uses additional components and/or devices in addition to and/or in lieu of those noted above and illustrated in FIGS. 1, 2, 3, 4, and 5.

As noted above, the processor and/or the input application will initially configure at least one sensor to scan an environment around the computing machine and determine whether there are any objects in the environment. The sensor can scan the environment by scanning a view of the sensor for any objects. In another embodiment, the sensor can emit one or more signals and scanning for feedback from the signals.

If any objects are found in the environment, the sensor can further be configured to determine whether a user is within a proximity of a computing machine 700. The sensor can capture information of the object for the sensor and/or the input application to analyze when determining whether the object is a user. When capturing the information, the sensor can capture a view of the object to identify a size, a shape, a distance, and/or to determine whether the object is stationary or if it has moved.

In another embodiment, the sensor can scan emit one or more signals. The signals can reflect or bounce off the object and the sensor and/or the input application can measure an amount of the reflected signals, an angle of the reflected signals, a series of the reflected signals and a time duration taken for the reflected signals to return. Utilizing the results, the sensor and/or the input application can determine a size of the object, shape of the object, distance of the object, and whether the object is stationary or has moved.

By comparing the size and/or shape to a predefined size and/or shape of a user, the sensor and/or input application can determine whether the object is a user. In other embodiments, the sensor and/or the input application additionally consider whether the object is stationary or in motion when determining whether the object is a user.

If the object is determined to be user, the sensor and/or the input application can continue to compare the identified distance of the user to a predefined distance to determine whether the user is within a proximity of the computing machine 700.

If the user is not within the proximity of the computing machine, the sensor will notify the input application and the input application will proceed to reject any input detected 750. When rejecting an input the input application can ignore any inputs received from the input device. In another embodiment, the input application can configure the input device to not transmit any inputs detected.

In other embodiments, when rejecting any input, the input application can configure the computing machine to enter a low power state. When in the low power state, the input application can power off a digital display device and the input device 770. Additionally, as noted above, when in the low power state, the sensor can continue to receive power and continue to scan for a user coming within proximity of the computing machine.

In another embodiment, if the sensor detects a user within a proximity of the computing machine, the input application will proceed to determine whether the computing machine is currently in a low power state 710. If the computing machine is currently in a low power state, the input application can configure the computing machine to transition into a high power state 720. As noted above, when in the high power state, the input device is power on and can detect an input from a user.

In another embodiments, if the computing machine is not in a low power state, the input application can proceed to configure the input device to detect an input entered by the user 730. As noted above, the user can enter an input command by accessing and interacting with an input device. The input device can be any device which a user can utilize to enter an input.

In one embodiment, the input device is a touch display device, a keyboard, a mouse, a microphone, and an image capturing device. In another embodiment, the sensor can additionally operate as the input device.

Once the input application has detected an input, the input device and/or the input application can proceed to identify a corresponding input command entered by the user. The input application and/or the input device can then transmit the input command for the computing machine or the input application to process 740.

The method is then complete or input application can continue to determine whether a user is within a proximity of the computing machine and repeat the method disclosed above. In other embodiments, the method of FIG. 7 includes additional steps in addition to and/or in lieu of those depicted in FIG. 7.

By configuring a sensor to determine whether a user is within a proximity of a computing machine, the computing machine can accurately and efficiently process an input command detected by an input device when the user is within the proximity of the computing machine. Additionally, by configuring the input device to reject an input command received when the sensor does not detect the user within a proximity of the computing machine, security can be increased for the computing machine and mistaken inputs can be decreased.

What is claimed is:

1. A method for processing an input command comprising:
   configuring a sensor to determine whether a user is within a proximity of a computing machine;
   configuring an input device to detect an input command entered by the user when the user is within the proximity of the computing machine;
   transmitting the input command for the computing machine to process; and
   configuring the input device to reject another input command detected when the user is not within the proximity of the computing machine.

2. The method for detecting an input command of claim 1 further comprising configuring the computing machine to enter a low power state when the sensor does not detect the user within the proximity of the computing machine after a predefined period of time.

3. The method for detecting an input command of claim 2 further comprising configuring the computing machine to enter a high power state in response to the sensor detecting the user within the proximity of the computing machine.

4. The method for detecting an input command of claim 2 further comprising power off a digital display coupled to the computing machine and the input device when the computing machine enters the low power state.

5. A computing machine comprising:
   a processor;
   a sensor configured to determine whether a user is within a proximity of the computing machine;
   an input device configured to receive an input from the user;
   an input application executed by the processor from computer readable memory and configured to configure the input device to reject input received in response to the sensor determining that the user is not within the proximity of the computing machine.

6. The computing machine of claim 5 further comprising a digital display device and the sensor is coupled to the digital display device.

7. The computing machine of claim 5 wherein the sensor includes at least one from the group consisting of a motion sensor, a proximity sensor, an infrared sensor, and an image capturing device.

8. The computing machine of claim 5 wherein the input device includes at least one from the group consisting of a touch display device, a keyboard, a mouse, a microphone, and an image capturing device.

9. The computing machine of claim 7 wherein the input application additionally utilizes facial detection technology when configuring the sensor to determine whether the user is within the proximity of the computing machine.

10. The computing machine of claim 5 wherein the computing machine includes a low power state and the sensor is configured to receive power from the computing machine while the computing machine is in the low power state.

11. The computing machine of claim 10 wherein the input device is configured to reject an input command received from the user while the computing machine is in the low power state.

12. A computer-readable program in a non-transitory computer-readable medium comprising:
   an input application configured to utilize a sensor to determine whether a user is within a proximity of a computing machine;
   wherein the input application is additionally configured to receive and process an input command received from an input device in response to the sensor determining that the user is within the proximity of the computing machine; and
   wherein the input application is further configured to configure the input device to reject the input command when the sensor determines that the user is not within the proximity of the computing machine.

13. The computer-readable program in a non-transitory computer-readable medium of claim 12 wherein determining whether a user is within a proximity of the computing machine includes configuring the sensor to scan for at least one object in an environment of the computing machine and determining whether the object is a user.

14. The computer-readable program in a non-transitory computer-readable medium of claim 13 wherein determining whether a user is within a proximity of the computing machine includes configuring the sensor to identify a distance of the user from the computing machine.

* * * * *